United States Patent
Swei et al.

(10) Patent No.: US 6,835,220 B2
(45) Date of Patent: Dec. 28, 2004

(54) ANTI-LOADING TREATMENTS

(75) Inventors: Gwo Shin Swei, East Amherst, NY (US); Anthony C. Gaeta, Lockport, NY (US); W. Patrick Yang, Ballston Lake, NY (US); Jony Wijaya, Williamsville, NY (US)

(73) Assignee: Saint-Gobain Abrasives Technology Company, Worcester, MA (US)

(*) Notice: Subject to any disclaimer, the term of this patent is extended or adjusted under 35 U.S.C. 154(b) by 28 days.

(21) Appl. No.: 10/121,293

(22) Filed: Apr. 12, 2002

(65) Prior Publication Data

US 2003/0066246 A1 Apr. 10, 2003

Related U.S. Application Data

(63) Continuation-in-part of application No. 09/754,912, filed on Jan. 4, 2001, now abandoned.

(51) Int. Cl.[7] .............................. B24D 3/00; B24D 3/28; B24D 17/00; B24D 11/00
(52) U.S. Cl. ........................... 51/295; 51/307; 51/308; 51/309; 51/297; 51/298
(58) Field of Search ........................ 51/307, 308, 309, 51/295, 297, 298; 428/143, 324, 330

(56) References Cited

U.S. PATENT DOCUMENTS

| | | | |
|---|---|---|---|
| 3,525,600 A | | 8/1970 | Yoshikawa et al. |
| 4,396,403 A | * | 8/1983 | Ibrahim ................. 51/295 |
| 4,973,338 A | * | 11/1990 | Gaeta et al. ............ 51/295 |
| 4,988,554 A | * | 1/1991 | Peterson et al. ......... 428/142 |
| 5,011,512 A | * | 4/1991 | Wald et al. ............. 51/295 |
| 5,078,753 A | * | 1/1992 | Broberg et al. .......... 51/298 |
| 5,127,197 A | * | 7/1992 | Brukvoort et al. ........ 451/533 |
| 5,316,812 A | * | 5/1994 | Stout et al. ............ 428/64.1 |
| 5,518,512 A | | 5/1996 | Hibbard |
| 5,667,542 A | * | 9/1997 | Law et al. ............. 51/308 |
| 5,669,941 A | * | 9/1997 | Peterson .............. 51/295 |
| 5,704,952 A | * | 1/1998 | Law et al. ............. 51/306 |
| 5,833,724 A | * | 11/1998 | Wei et al. ............. 51/307 |
| 5,851,247 A | | 12/1998 | Stoetzel et al. |
| 5,863,306 A | | 1/1999 | Wei et al. |
| 5,914,299 A | | 6/1999 | Harmer et al. |
| 5,954,844 A | * | 9/1999 | Law et al. ............. 51/306 |
| 6,056,794 A | | 5/2000 | Stoetzel et al. |
| 6,059,850 A | * | 5/2000 | Lise et al. ............. 51/297 |
| 6,183,346 B1 | * | 2/2001 | Gagliardi ............. 451/28 |
| 6,394,888 B1 | | 5/2002 | Matsumoto et al. |

FOREIGN PATENT DOCUMENTS

| | | |
|---|---|---|
| DE | 3111232 A1 | 9/1982 |
| GB | 416730 | 9/1934 |
| WO | WO 00/73023 A1 | 12/2000 |
| WO | WO 00/73023 * | 12/2000 |
| WO | WO 02/062531 A1 | 8/2002 |

* cited by examiner

Primary Examiner—Michael Marcheschi
(74) Attorney, Agent, or Firm—Joseph P. Sullivan

(57) ABSTRACT

An abrasive is give a top coat layer consisting essentially of an inorganic, anti-loading agent selected from the group consisting of metal silicates, silicas, metal carbonates, and metal sulfates. The metal silicates can be selected from the group consisting of magnesium silicates, potassium aluminum silicates, aluminum silicates, and calcium silicates. In one embodiment, the magnesium silicates include talc, the potassium aluminum silicates include micas, the aluminum silicates include clays, and the calcium silicates include wollastonite. The silicas can be selected from the group consisting of fused silica, fumed silica, and precipitated amorphous silica. The metal carbonates can include calcium carbonate. The metal sulfates can include hydrous calcium sulfate or anhydrous calcium sulfate.

32 Claims, 1 Drawing Sheet

ANTI-LOADING TREATMENTS

This application is a CIP of application Ser. No. 09/754,912, filed Jan. 4, 2001, now abandoned.

BACKGROUND OF THE INVENTION

Coated abrasive products are used to sand a wide variety of substrates, which can include soft, difficult to finish materials, such as painted surfaces. When finishing these soft materials the coated abrasive products cannot perform to their maximum potential because of premature loading. Loading is the coalescence of swarf which clogs the spaces between abrasive grains, thus preventing the abrasive product from being able to continue to effectively abrade the work substrate or surface. The abrasives industry approach is to utilize chemical compounds, such as metal soaps (i.e., zinc stearates, calcium stearates) applied as an oversize coating, or incorporated into the size coat, which is typically referred to as the first sizing coating. Stearate technology provides adequate stock removal and anti-loading characteristics. However, metal stearates leave a residue of low surface energy material on the work surface, that can potentially cause post-processing problems, such as coating defects in down stream painting processes.

Contamination of this low surface energy material can be detected by measuring the water contact angle on the sanded substrate. The typical practice to address this issue is to clean the sanded surface with solvent wipes to insure that preferably all the contamination is removed, or finish with a non-stearated product.

SUMMARY OF THE INVENTION

It would be preferable to eliminate the step of cleaning the sanded surface with solvent wipes, which expends valuable time and money in the painting process. Further, non-stearated products generally do not provide long life.

In one embodiment, an abrasive, such as a coated or composite abrasive, is given a top coat layer consisting essentially of an inorganic, anti-loading agent selected from the group consisting of metal silicates, silicas, metal carbonates, and metal sulfates.

The layer consists essentially of the inorganic anti-loading additive and this is meant to indicate that the layer comprises no additive having organic components such as typify conventional anti-loading additives, including metal salts of organic acids, organophosphate, organosilicates, organoborates and the like. It does not however preclude the presence of a cured binder component that provides the vehicle by which the inorganic loading agent is applied The metal silicates can be selected from the group consisting of magnesium silicates, potassium aluminum silicates, aluminum silicates, and calcium silicates. In one embodiment, the magnesium silicates include talc, the potassium aluminum silicates include micas, the aluminum silicates include clays, and the calcium silicates include wollastonite. The silicas can be selected from the group consisting of fused silica, fumed silica, and precipitated amorphous silica. The metal carbonates can include calcium carbonate. The metal sulfates can include hydrous calcium sulfate or anhydrous calcium sulfate.

The anti-loading agent can have a Mohs hardness value of less than about 7, and preferably less than about 3. The anti-loading agent can have a mean particle diameter size of less than about 30 micrometers and preferably in the range of between about 1 and about 20 micrometers. This allows the anti-loading agent to form sufficiently small particles that combine with swarf from a sanded surface, such as a painted metal surface, to prevent sufficient agglomerating loading of swarf in a surface of the coated abrasive. That is, the particles of the anti-loading agent are of such a size that, upon sanding a painted surface using the coated abrasive to produce abraded swarf, particles of the anti-loading agent are released that combine with and inhibit the agglomeration of such swarf particles.

In a further embodiment, the anti-loading agent is present exclusively in the top layer of the coated abrasive in an amount that represents at least 4 $g/m^2$ for lighter weight agents such as fumed silica or talc and at least 10 $g/m^2$ for more dense agents such as metal silicates.

The anti-loading agent is preferably applied in a formulation in which it is dispersed in a binder, for example, a binder comprising a thermoplastic or a curable thermosetting resin. For example, the thermoplastic resin can have the form of a latex and the thermosetting resin can be selected from the group consisting of urea formaldehyde, phenolic, epoxy, urethane, and radiation curable resin systems.

An abrasive, such as a coated or composite abrasive, is also provided which includes a backing layer having a first surface, an abrasive layer comprising a plurality of abrasive particles disposed on the first surface of the backing layer, and an outer or top layer consisting essentially of an inorganic anti-loading agent disposed over the abrasive-containing layer. In one embodiment, the anti-loading agent is deposited over a cured size coat.

A method for forming an abrasive, such as a coated or composite abrasive, is also provided which includes adhering a layer comprising a plurality of abrasive particles to a first surface of a backing layer and depositing a layer consisting essentially of an anti-loading agent over the abrasive particle-containing layer.

BRIEF DESCRIPTION OF THE DRAWINGS

The foregoing and other objects, features and advantages of the invention will be apparent from the following more particular description of preferred embodiments of the invention. The accompanying drawing is not necessarily to scale, emphasis instead being placed upon illustrating the principles of the invention.

The FIGURE illustrates the contact angle for a drop of liquid on a solid surface.

DETAILED DESCRIPTION OF THE INVENTION

Coated abrasives generally comprise those products having abrasive grits adhered to a support backing which can be used to abrade or otherwise wear down a surface of an article to which they are applied.

The support backing of a coated abrasive may be rigid, but generally is flexible and typically comprises a web of material, such as paper, cloth, fibrous pad, polymeric film, vulcanized fiber, or a combination of such materials and the like. In some applications, the support backing initially includes a collection of loose fibers, to which the abrasive grits are added, with or without further binder material, to provide an abrasive web having grits throughout. The loose collection of fibers and grits may be compressed, if no adhering binder is present, or otherwise fixed or cured when a binder is present to form the coated abrasive.

The abrasive grits can generally be any material which has the capability of abrading the workpiece article and typically includes sand, flint, corundum, metallic oxides such as aluminum oxide, aluminum-zirconia, ceramic alumina, diamond, silicon carbide, garnet, rouge, crocus, and the like. The grits typically have sharp edges which act as the abrading means, but the quality and quantity of the sharp edges depends upon the utility. The grits can be embedded into or intermingled with the support backing, but, more typically are adhered to the support backing by an appropriate binder material. The grits can be applied or intermingled with the web in a specific pattern or grain or may be randomly distributed. Typically elaborate measures are taken to assure that the coated abrasive has a fixed grain with an appropriate distribution of granular cutting edges in one or more layers.

The binder material is generally any convenient material which can act to adhere the grits to the support backing and have resistance to negating the abrading process. Typical binder materials include the phenolic resins, hide glues, varnishes, epoxy resins, acrylates, multi-functional acrylates, urea-formaldehyde resins, trifunctional urethanes, polyurethane resins, lacquers, enamels and any of a wide variety of other materials which have the ability to stabilize the grits in adhering relationship to the support backing. Generally, the binding material is carefully chosen to provide maximum efficiency of the coated abrasive for the abrading surface contemplated. Care is taken in selecting binder materials which can resist softening or burning or both due to overheating yet provide adequate adhesion.

The grits can be sprayed or otherwise coated with the binder material and deposited on or about the support backing, or the support backing may be coated with the binder material and the grits thereafter deposited thereon. Many alternate forms of support backings, granular materials, binder materials, means of arranging the grits on the support backing, means of adhering the grits and the like are known in the prior art and are seen as variations contemplated as within the scope of this invention.

Generally in the manufacture of a conventional coated abrasive, a backing, (with or without a pre-treatment), is given a maker coat of a binder resin is applied and, while the resin is still tacky, abrasive grits are applied over the maker coat, and the binder is cured so as to hold the grits in place. A size coat, comprising essentially a binder resin and optionally fillers, grinding aids and the like, is then applied over the grits and cured. The primary function of the size coat is to anchor the grits in place and allow them to abrade a workpiece without being pulled from the coated abrasive structure before their grinding capability had been exhausted. In some cases, a supersize layer is deposited over the size coat. The function of this layer is to place on the surface of the coated abrasive an additive that enhances grinding capability. The supersize layer generally, but not necessarily, plays no part in securing the grits in place on the coated abrasive. It is also possible to disperse abrasive grits in a curable binder and then deposit that mixture on a backing material before curing the binder component.

It is also known to impose structures upon such deposited abrasive/binder formulations so as to give a surface engineered to provide aggressive cutting and a fine finish. Such engineered abrasives can have a size coat or even a supersize coat applied over the surface. They can also be suitable coated abrasives to receive the outer or top coat of the present invention.

The present invention does not relate to maker, size or, (where applied), supersize coats since it is applied as the top coat in a coated abrasive structure. The coats applied below the top coat have specific functions as recited above. The top coat described herein has the function of creating a surface that resists the loading by swarf accumulation that shortens the useful life of many coated abrasives.

In accordance with the present invention, the anti-loading agents, which are applied as the top or outer coating of a coated abrasive, can be selected from the group consisting of metal silicates, silicas, metal carbonates, and metal sulfates. The metal silicates can be selected from the group consisting of magnesium silicates, potassium aluminum silicates, aluminum silicates, and calcium silicates. In one embodiment, the magnesium silicates include talc, the potassium aluminum silicates include micas, the aluminum silicates include clays, and the calcium silicates include wollastonite. The silicas can be selected from the group consisting of fused silica, fumed silica, and precipitated amorphous silica. The metal carbonates can include calcium carbonate. The metal sulfates can include hydrous calcium sulfate or anhydrous calcium sulfate.

The additive may be applied as a dispersion in a binder (which will be subsequently cured), or in a liquid dispersion which will simply dry leaving the additive on the surface. In one embodiment, the binder includes a thermoplastic or thermoset resin. For example, the thermoplastic resin can include latex and the thermoset resin can be selected from the group consisting of urea formaldehyde, phenolic, epoxy, urethane, and radiation curable resin systems. With some additives, adhesion to the surface can be achieved without the need for a dispersion medium.

Since the objective is to create an anti-loading layer on the surface the content of the additive is preferably as large as the system can support. Where the additive is capable of adhering directly to the surface, it can be added without a carrier medium. However for some additives a binder is require to ensure that the anti-loading agent adheres effectively to the coated abrasive surface rather than being displaced by even mild physical forces. Thus an effective formulation can comprise from 40 to 100% by volume, and preferably from 60 to 100% by volume, of the inorganic anti-loading agent with any balance being provided by a carrier medium such as water or a curable binder. For some silicates, such as alkali metal silicates, which are soluble in water, the anti-loading layer can be applied as a solution which dries on to the surface leaving a layer of the silicate behind. Solutions of such silicates are available as liquid binders from PQ Corporation and can be used alone or as binders for other inorganic anti-loading additives according to the invention.

In accordance with the present invention, the inorganic anti-loading agent, in the course of use, appears to release fine particles that coat fine swarf particles generated by the grinding process thus preventing them from agglomerating to form troublesome larger particles that get trapped on the coated abrasive surface, (known as "loading"), reducing its effectiveness. Thus loading of the coated abrasive is reduced without causing the problems associated with the use of the conventional stearated anti-loading layers. With such additives, a fine coat of low energy material is smeared on the abraded surface which makes subsequent painting or polishing of the surface very difficult unless this coat is removed.

The anti-loading agent of the present invention, in one embodiment, is relatively soft, for example, having a Mohs hardness value of less than about 7, and preferably less than about 3. In one embodiment, the loading agent has a mean particle diameter size range of less than about 30 micrometers and preferably between about 1 and about 20 micrometers as finer particles size materials appear to function better as an anti-loading agent.

It is believed that one mechanism for providing a non-loading characteristic is for the anti-loading agent to prevent the swarf particles from adhering to each other, therefore reducing loading. This approach produces fine dust during sanding, while without the inorganic anti-loading agent, the swarf tends to form balls or large chips which become lodged in between the grain particles, which prevent effective grinding, and reduce the life of the coated abrasive. The difference in the appearance of the swarf resulted from sanding with stearated and non-stearated products are visible.

In accordance with the present invention, the concentration of the anti-loading agent in a formulation applied to provide the top layer of a sanding surface is preferably greater than about 60 percent, and more preferably still greater than about 70 or even 80 percent by volume. This ensures that the anti-loading agent is sufficiently present to be effective to produce the fine dust which prevents the swarf from agglomerating. The anti-loading agent thus applied can have a surface application level, measured as the dry coat weight, of from 2 g/m² and upwards, such as from 2 to 50 g/m² and more preferably from 4 to 30 g/m². However it will be appreciated that lighter weight agents such as mica, silica or talc will tend to have a lower application weight than the more dense agents such as metal silicates even when similar volumes of formulation with the same concentration of agent have been used.

EXAMPLE 1

Hydrous Magnesium Silicate (Talc) in Different Median Particle Sizes

In the following Example and those following a standard conventional coated abrasive is used. The backing material is an A-weight paper and the make coat and size coat comprise a urea-formaldehyde binder. In each case the abrasive particles are P320 aluminum oxide. To this base coated abrasive, an outer coat is applied comprising an anti-load additive. In one case, no additive was applied for comparative purposes. In a second case, an outer coating containing zinc stearate is applied and in three other cases the applied coating was hydrous magnesium silicate (talc) with different particle sizes. The additives were applied as dispersion in latex and water containing the indicated volume % of the additive.

The coated abrasives were then used to abrade an acrylic panel using a dual action sander for six contacts of two minute interval each. The grinding was done by a 12.7 cm (5-inch) disc with a 4.5 kg (10-lb.) load. The amount of cut after the total grinding time of 12 minutes was recorded, and the grinding performance was measured as percent cut of the control. The average surface roughness values, Ra (the arithmetic average of roughness) were also measured. The results are recorded in the Table 1 below which demonstrates that talc is as effective as the more conventional zinc stearate.

TABLE 1

| Anti-load Material | None | Zinc Stearate | Hydrous Magnesium Silicate (Talc) | Hydrous Magnesium Silicate (Talc) | Hydrous Magnesium Silicate (talc) |
|---|---|---|---|---|---|
| Item | Base Control | Zinc Stearate | Vertal 1500 | Supreme HT | Arctic Mist |
| Anti-load Median Particle Size | N/a | 5.6 micron | 15 micron | 7 micron | 1.9 micron |
| Dry coat weight (g/m²) | N/A | 14.80 | ~13.32 | ~13.32 | ~13.32 |
| Anti-loading agent Volume % | N/A | 90 | 81 | 81 | 81 |
| Binder volume % | N/A | 9.05 | 11 | 11 | 11 |
| Cut (% of Control) | 100% | 136% | 121% | 134% | 137% |
| Surface Finish, Ra ($\mu$) | 0.46 | 0.41 | 0.46 | 0.46 | 0.46 |

Vertal 1500, Supreme HT and Arctic Mist are talc's available from Luzenac America, Inc.

EXAMPLE 2

Hydrous Magnesium Silicate (Talc), Supreme HT in Different Grit Sizes

The following tables illustrate a comparison of grinding performance of Supreme HT Talc with zinc stearate, and a control with no anti-loading agent for an aluminum oxide coated abrasives in grits P80, P180, and P320 (Table 2, Table 3, and Table 4, respectively). The test conditions were otherwise as indicated in Example 1.

The results show that the cut was higher with the incorporation of anti-load agent of the present invention versus base control especially in finer grits.

TABLE 2

| P80 | Base Control | Witco Zn-St Dispersion | Supreme HT Talc |
|---|---|---|---|
| Dry coat weight (g/m²) | N/A | 14.80 | ~13.32 |
| Anti-loading agent Volume % | N/A | 90 | 81 |
| Binder volume % | N/A | 9.05 | 11 |
| Cumulative Cut (g) | 21.61 | 24.43 | 22.54 |
| % Cut of Control | 100% | 113% | 104% |
| Ra ($\mu$) | 1.88 | 1.96 | 2.05 |

TABLE 3

| P180 | Base Control | Witco Zn-St Dispersion | Supreme HT Talc |
|---|---|---|---|
| Dry coat weight (g/m$^2$) | N/A | 14.80 | ~13.32 |
| Anti-loading agent Volume % | N/A | 90 | 81 |
| Binder volume % | N/A | 9.05 | 11 |
| Cumulative Cut (g) | 15.87 | 23.5 | 19.76 |
| % Cut of Control | 100% | 148% | 125% |
| Ra ($\mu$) | 0.84 | 0.89 | 0.89 |

TABLE 4

| P320 | Base Control | Witco Zn-St Dispersion | Supreme HT Talc |
|---|---|---|---|
| Dry coat weight (g/m$^2$) | N/A | 14.80 | ~13.32 |
| Anti-loading agent vol % | N/A | 90 | 81 |
| Binder vol. % | N/A | 9.05 | 11 |
| Cumulative Cut (g) | 7.75 | 13.51 | 12.93 |
| % Cut of Control | 100% | 174% | 167% |
| Ra ($\mu$) | 0.46 | 0.41 | 0.43 |

EXAMPLE 3

Amorphous Silica, Calcium Silicate (Wollastonite), Aluminum Silicate (Clay), and Potassium Aluminum Silicate (Mica)

A standard P320 grit A-weight paper aluminum oxide conventional coated abrasive is used. To this base coated abrasive is applied a top coat consisting essentially of an anti-load additive of either Amorphous Silica, Calcium Silicate (Wollastonite), Aluminum Silicate (Clay) or Potassium Aluminum Silicate (Mica). The grinding results, set forth in Table 5 below, show that the cut was higher with the incorporation of anti-load agent of the present invention versus base control.

EXAMPLE 4

Calcium Sulfate (Anhydrous and Hydrous)

A standard P320 grit A-weight paper aluminum oxide conventional coated abrasive is used. To this base coated abrasive is applied an oversize coat comprising an anti-load additive of calcium sulfate (anhydrous or hydrous). The results, set forth in Table 6 below, show that the cut was higher with the incorporation of anti-load agent of the present invention versus base control.

TABLE 6

| Anti-Load Additive Item | Base Control | Anhydrous Calcium Sulfate SNOW WHITE | Hydrous Calcium Sulfate TERRA ALBA |
|---|---|---|---|
| Dry coat weight (g/m$^2$) | N/A | 34.04 | 29.60 |
| Filler volume % (Anti-loading agent) | N/A | 76 | 82 |
| Binder volume % | N/A | 14 | 9 |
| % Cut of Control | 100% | 153% | 141% |
| Surface roughness, Ra ($\mu$) | 0.51 | 0.41 | 0.43 |

SNOW WHITE is an anhydrous calcium sulfate available from United States Gypsum Company.
TERRA ALBA is a hydrous calcium sulfate available from United States Gypsum Company.

EXAMPLE 5

Water Contact Angle of Sanded Paint Panels After Sanding

Primer panels were sanded with P320 grit coated abrasives with oversize coating described in Examples 1 to 4. The same sanded procedure was used with each coated abrasive. A drop of water was then placed on each of the freshly ground panels and also on panel that had received no grinding and the contact angle $\Theta$ as described in the FIGURE was recorded. $\gamma_{lv}$, $\gamma_{sv}$ and $\gamma_{sl}$ represent the surface tension between the liquid-vapor, solid-vapor, and solid-liquid interfaces, respectively. The contact angle is the angle between the surface of a liquid and the surface of a solid plane at the line of contact. A higher contact angle is

TABLE 5

| Anti-Load Material | | Amorphous Silica | Calcium Silicate | Anhydrous aluminum silicate (Clay) | Hydrous aluminum silicate (Clay) | Hydrous potassium aluminum silicate (Mica) |
|---|---|---|---|---|---|---|
| Item | Control | MN-23 | Wollastonite | Optiwhite | Burgess 17 | Mica 325 |
| Dry coat weight (g/m$^2$) | N/A | 4.44 | 51.80 | 7.40 | 16.28 | 2.96 |
| Anti-loading agent Volume % | N/A | 81 | 83 | 80 | 79 | 79 |
| Binder volume % | N/A | 12 | 10 | 12 | 12 | 12 |
| % Cut of Control | 100% | 161% | 113% | 179% | 113% | 149% |
| Surface roughness, Ra ($\mu$) | 0.61 | 0.51 | 0.43 | 0.53 | 0.61 | 0.38 |

MN-23 is amorphous silica available from Eagle Pitcher.
Wollastonite 325 is a calcium silicate available from NYCO Minerals, Inc.
Optiwhite is clay available from Burgess Pigment Company.
Burgess 17 is a clay available from Burgess Pigment Company.
Mica 325 a mica available from Oglebay Norton Speciality Minerals.

indicative of less wetting. The results are shown in the Table 7 which clearly indicates that the panel ground with a coated abrasive according to the present invention had essentially the same or lower contact angle as the panel ground using a coated abrasive without the anti-loading layer. The coated abrasive having the conventional zinc stearate anti-loading layer clearly deposited a low surface energy residue, the presence of which is indicated by the very high water contact angle. The consequence of this is that paints applied to such a surface do not readily wet the surface and this leads to surface defects.

TABLE 7

| Anti-Load Material | n/a | zinc stearate | Hydrous magnesium silicate (Talc) | Hydrous potassium aluminum Silicate (Mica) | calcium silicate | Anhydr. calcium sulfate |
|---|---|---|---|---|---|---|
| Item | Base Control | Zinc Stearate | Supreme HT | Mica 325 | Wollastonite | SNOW WHITE |
| Dry coat weight (g/m²) | N/A | 14.80 | ~7.40–17.76 | 2.96 | 51.80 | 34.04 |
| Anti-loading agent Volume % | N/A | 90 | 81 | 79 | 83 | 76 |
| Binder volume % | N/A | 9.05 | 11 | 12 | 10 | 14 |
| Water Contact Angle (degree) | 115 | 140 | 114 | 119 | 86 | 107 |

The water contact angle on panel that had received no grinding is 69 degrees.

While this invention has been particularly shown and described with references to preferred embodiments thereof, it will be understood by those skilled in the art that various changes in form and details may be made therein without departing from the scope of the invention encompassed by the appended claims.

What is claimed is:

1. A coated abrasive with an outer layer applied over a supersize layer, the outer layer consisting essentially of an inorganic, anti-loading agent selected from the group consisting of metal silicates, silicas, metal carbonates, and metal sulfates.

2. The coated abrasive of claim 1 wherein the metal silicates are selected from the group consisting of magnesium silicates, potassium aluminum silicates, aluminum silicates, potassium silicate, sodium silicate and calcium silicates.

3. The coated abrasive of claim 2 wherein the magnesium silicates include talc.

4. The coated abrasive of claim 2 wherein the potassium aluminum silicates include micas.

5. The coated abrasive of claim 2 wherein the aluminum silicates include clays.

6. The coated abrasive of claim 2 wherein the calcium silicates include wollastonite.

7. The coated abrasive of claim 1 wherein the silicas are selected from the group consisting of fused silica, fumed silica, and precipitated amorphous silica.

8. The coated abrasive of claim 1 wherein the metal carbonates include calcium carbonate.

9. The coated abrasive of claim 1 wherein the metal sulfates include hydrous calcium sulfate or anhydrous calcium sulfate.

10. The coated abrasive of claim 1 wherein the anti-loading agent has a Mohs hardness value of less than about 7.

11. The coated abrasive of claim 1 wherein the anti-loading agent has a mean particle diameter size of less than about 30 micrometers.

12. The coated abrasive of claim 11 wherein the anti-loading agent has a mean particle diameter size in the range of between 1 and 20 micrometers.

13. The coated abrasive of claim 1 wherein the anti-loading agent provides at least 60 volume percent of the formulation applied to provide the outer layer.

14. The coated abrasive of claim 13 wherein the anti-loading agent provides at least 80 volume percent of the formulation applied to provide the outer layer.

15. The coated abrasive of claim 1 in which particles of the anti-loading agent are of such a size that, upon sanding a painted surface using the coated abrasive to produce abraded swarf, particles of the anti-loading agent are released that combine with and inhibit the agglomeration of such swarf particles.

16. The coated abrasive of claim 1 wherein the anti-loading agent is dispersed in a binder.

17. The coated abrasive of claim 16 in which the anti-loading agent is dispersed in a solution of a metal silicate binder.

18. The coated abrasive of claim 16 wherein the binder includes a thermoplastic or thermoset resin.

19. The coated abrasive of claim 18 wherein the thermoplastic resin is in the form of a latex.

20. The coated abrasive of claim 18 wherein the thermoset resin is selected from the group consisting of urea formaldehyde, phenolic, epoxy, urethane, and radiation curable resin systems.

21. A coated abrasive comprising:
   a backing layer having a first surface;
   an abrasive layer having a plurality of abrasive particles disposed on the first surface of the backing layer;
   a supersize layer disposed over the abrasive layer; and
   a layer consisting essentially of an inorganic anti-loading agent disposed over the supersize layer.

22. The abrasive of claim 21 wherein the anti-loading agent is selected from the group consisting of metal silicates, silicas, metal carbonates, and metal sulfates.

23. The abrasive of claim 22 wherein the metal silicates are selected from the group consisting of magnesium silicates, potassium aluminum silicates, aluminum silicates, and calcium silicates.

24. The abrasive of claim 21 in which particles of the anti-loading agent are of such a size that, upon sanding a painted surface using the coated abrasive to produce abraded swarf, particles of the anti-loading agent are released that combine with and inhibit the agglomeration of such swarf particles.

25. A method for forming an abrasive, comprising:

attaching a plurality of abrasive particles to a first surface of a backing layer;

depositing a supersize layer over the abrasive particles; and depositing a layer consisting essentially of an anti-loading agent over the supersize layer, the anti-loading agent being selected from the group consisting of metal silicates, silicas, metal carbonates, and metal sulfates, said agent being applied in a formulation consisting of at least 60% by volume of the agent so as to provide a surface coating of the agent.

26. The method of claim 25 wherein the metal silicates are selected from the group consisting of magnesium silicates, potassium aluminum silicates, aluminum silicates, and calcium silicates.

27. The method of claim 26 wherein the magnesium silicates include talc.

28. The method of claim 25 wherein the anti-loading agent has a Mohs hardness value of less than about 7.

29. The method of claim 25 wherein the anti-loading agent has a mean particle size of less than about 30 micrometers.

30. The method of claim 25 further comprising the step of dispersing the anti-loading agent in a binder.

31. The method of claim 30 wherein the binder comprises a polymeric component selected from the group consisting of thermoplastic resins, thermoset resins and mixtures thereof.

32. The method of claim 25 wherein the binder comprises an inorganic alkali metal silicate solution.

* * * * *